J. & E. BOTSCH.
STEERING DEVICE.
APPLICATION FILED OCT. 19, 1911.
1,027,981.
Patented May 28, 1912.
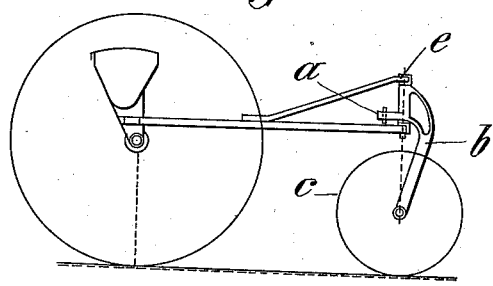
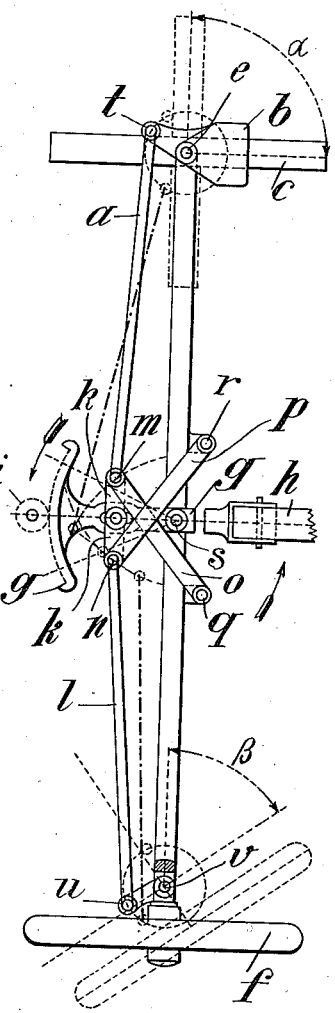
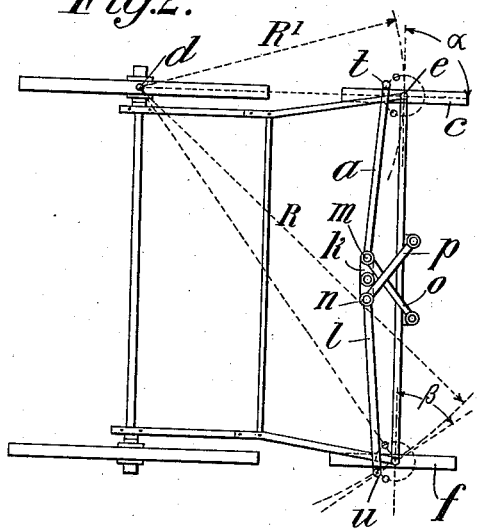
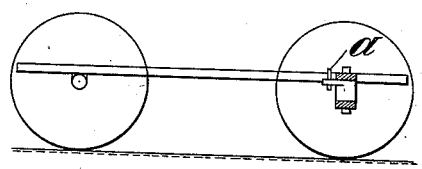
Witnesses:
W. O. Williams
F. Cornwall
Inventor:
Jakob Botsch a. Emil Botsch
                        Attorney

UNITED STATES PATENT OFFICE.

JAKOB BOTSCH AND EMIL BOTSCH, OF RAPPENAU, BADEN, GERMANY.

STEERING DEVICE.

1,027,981.  Specification of Letters Patent.  Patented May 28, 1912.

Application filed October 19, 1911. Serial No. 655,607.

*To all whom it may concern:*

Be it known that we, JAKOB BOTSCH and EMIL BOTSCH, both subjects of the German Emperor, and residents of Rappenau, Baden, Germany, have invented a certain new and useful Steering Device, of which the following is a specification.

This invention relates to steering devices for vehicles, drills, motor plows, agricultural machines and implements, as well as for motor vans and cars wherein the front wheels are mounted on steering swivels, the oblique steering arms of which are connected with the pole or the actuating member of the steering device by links so as to form a hinged polygon. In the steering devices of this kind known until now, the steering rods are connected with hinged tetragons or pentagons which, under certain circumstances and owing to an increased number of steering rods, allow of a steering angle of 30 up to at the utmost 60° being obtained and which adjust the steering wheels separately under a determined angle between the limits stated. However if it is required to turn in curves having small radii or even to turn around in so sharp a manner that the two steerable front wheels turn around a nonrolling back wheel, like around a fixed point, as this is desirable when space is limited in motor plows, drills, chopping machines, manure distributing machines and the like, the said result can be obtained by no means with the actual steering device having wheels with steering swivels; on the contrary it was necessary in such a case to sacrifice the steerability and to turn the entire fore part of the carriage around.

Now, the object of this invention is to allow of every turning, even the shortest one being executed with the steerable front wheels alone and with these objects in view this invention consists essentially in that the steering rods are connected together by an intermediate member adapted to move by means of a pivot in a slot of the actuating member of the steering gear and in that the motion of these parts is still under the control of two crosswise arranged links connected therewith and supported by the front axle.

The accompanying drawing, given by way of example shows one form of embodiment of the device applied to two types of carriages, Figure 1 showing the side elevation view of the carriage of an agricultural machine the front wheels $c$ of which are each mounted in a vertical fork so as to be able to rotate around a vertical axis $e$. Fig. 2 shows the diagrammatical top plan view of the carriage shown by Fig. 1. This figure shows the necessary position of the wheels by the angle $\alpha$ and the angle $\beta$ so that the steering front wheels are adapted to rotate around the point of rotation $d$ of the carriage in circles having the radii R and R'. Fig. 3 shows a side elevation view of a motor van belonging to the second type of carriage in which the steering front wheels are supported in a horizontal fork, the top plan view of this device being shown at the bottom of Fig. 4 on the right. Fig. 4 shows at a somewhat enlarged scale a top plan view of the pairs of steering wheels, the steering wheel $c$ being supported by a vertical fork as in Fig. 1, the wheel $f$ in a horizontal fork as in Fig. 3.

According to this invention, the bars $a$ and $l$ are connected together by means of an intermediate member $k$ which extends from the point of articulation $m$ to the point of articulation $n$. Hingedly connected with these two hinge points $m$ and $n$ are furthermore two crosswise arranged rods $o$ and $p$ having the same length and having their ends $q$ and $r$ pivotally connected with the front part of the axle. The steering rod $a$ is connected by means of a pivot $t$ for instance in the one of the forms of embodiment shown with the vertical swivel fork $b$ which may rotate around a vertical axis $e$, and with the wheel $c$. In the other form of embodiment the steering rod $l$ is hingedly connected at its end, by means of the pivot $n$ and a horizontal fork having a pivot $v$, with the wheel $f$.

Provided in the center of the front axle is a casting $g$ (Fig. 4) which extends rearward and is provided with a longitudinal slot adapted to receive the tenon of the intermediate piece $k$. The rear part of the casting forms a toothed arc with which a toothed wheel $i$ meshes. The casting $g$ which has its fulcrum on the axle at the point $s$, can still be extended beyond its fulcrum $s$ so as to be adapted to receive a pole $h$ which may also be employed for performing the steering. If it is for instance desired to turn to the left, around the point $d$ (Fig. 2) as a center, the intermediate piece $k$ is shifted from its central position (Figs. 2 and 4) toward the wheel $f$ which may be effected by the pinion *i* or by the pole *h*; during this motion the intermediate piece K owing to the presence of the links *o* and *p* rotates around the fixed points *q* and *r* as centers, describing corresponding arcs of a circle. During this motion the two ends *m* and *n* of the intermediate member K move along arcs of a circle having different lengths. The point *m* moves with the link length *o* around the point *q* on a longer arc than the point *n* does with the same link length *p* around the point *r*. It follows therefrom that when a turn is effected toward the left the steering rod *a* moves at the same time over a longer distance than the steering rod *l*. As the levers *t—e* and *u—v* have the same length, the wheel *f* is adjusted with reference to the axle under a smaller angle $\beta$ than the wheel *c* which forms a larger angle $\alpha$. The wheel *f* is thus adjusted according to an arc of circle having the radius R while the wheel *c* follows an arc of a circle with the radius R'. This is shown by the dot and dash lines in Figs. 2 and 4. When the vehicle turns to the right, the same operation takes place in exactly the same manner but with reversed direction of rotation.

Having now fully described our said invention, what we claim and desire to secure by Letters Patent, is:

1. In a steering device for vehicles of the kind described the combination with the steering wheels, the steering swivels, the front axle, the steering rods and the actuating member of the steering device, of an intermediate member adapted to pivotally connect the said steering rods together, a pivot on said intermediate member and a longitudinal slot provided in the said actuating member and adapted to receive the pivot of said intermediate member and links pivoted to the ends of the intermediate member and the front axle, substantially as and for the purpose set forth.

2. In a steering device for vehicles of the kind described the combination with the front axle, the steering swivels, the steering wheels, the steering rods and the actuating member of the steering device of the vehicle, of an intermediate member adapted to pivotally connect the said steering rods together, a pivot on said intermediate member, a longitudinal slot provided in said actuating member of the steering device and adapted to receive said pivot of the intermediate member, two crosswise arranged links, means for pivotally connecting the front ends of said links with the front part of said axle and means for pivotally connecting the rear parts of said links with the connecting ends of said intermediate member, substantially as and for the purpose set forth.

3. In combination, an axle, steering knuckles pivoted to the axle, wheels mounted on the steering knuckles, an actuating lever pivoted to the axle and formed with a slot, an intermediate lever pivoted in the slot of the actuating lever, links pivoted to the opposite ends of the intermediate lever, said links crossing each other and having their opposite ends pivoted to the axle, rods pivotally connecting the ends of the intermediate lever and the knuckles and means for operating the actuating lever.

4. In combination, an axle, knuckles pivoted to the axle, wheels mounted on the steering knuckles, an actuating lever formed with a slot, an intermediate lever pivoted in the slot, rods connecting the ends of the intermediate lever with the knuckles, means including pivoted links secured at the pivotal points of the rods and the intermediate lever, whereby to cause the intermediate lever to turn on its pivot and move longitudinally when the actuating lever is operated and means for operating the actuating lever.

In testimony whereof we have hereunto set our hands in presence of two witnesses.

JAKOB BOTSCH.
EMIL BOTSCH.

Witnesses:
JOSEPH HEIFFER,
S. H. SHANK.

---

Copies of this patent may be obtained for five cents each, by addressing the "Commissioner of Patents, Washington, D. C."